No. 764,203. PATENTED JULY 5, 1904.
J. A. PERKINS.
CONOMETER.
APPLICATION FILED AUG. 24, 1903.
NO MODEL. 6 SHEETS—SHEET 1.
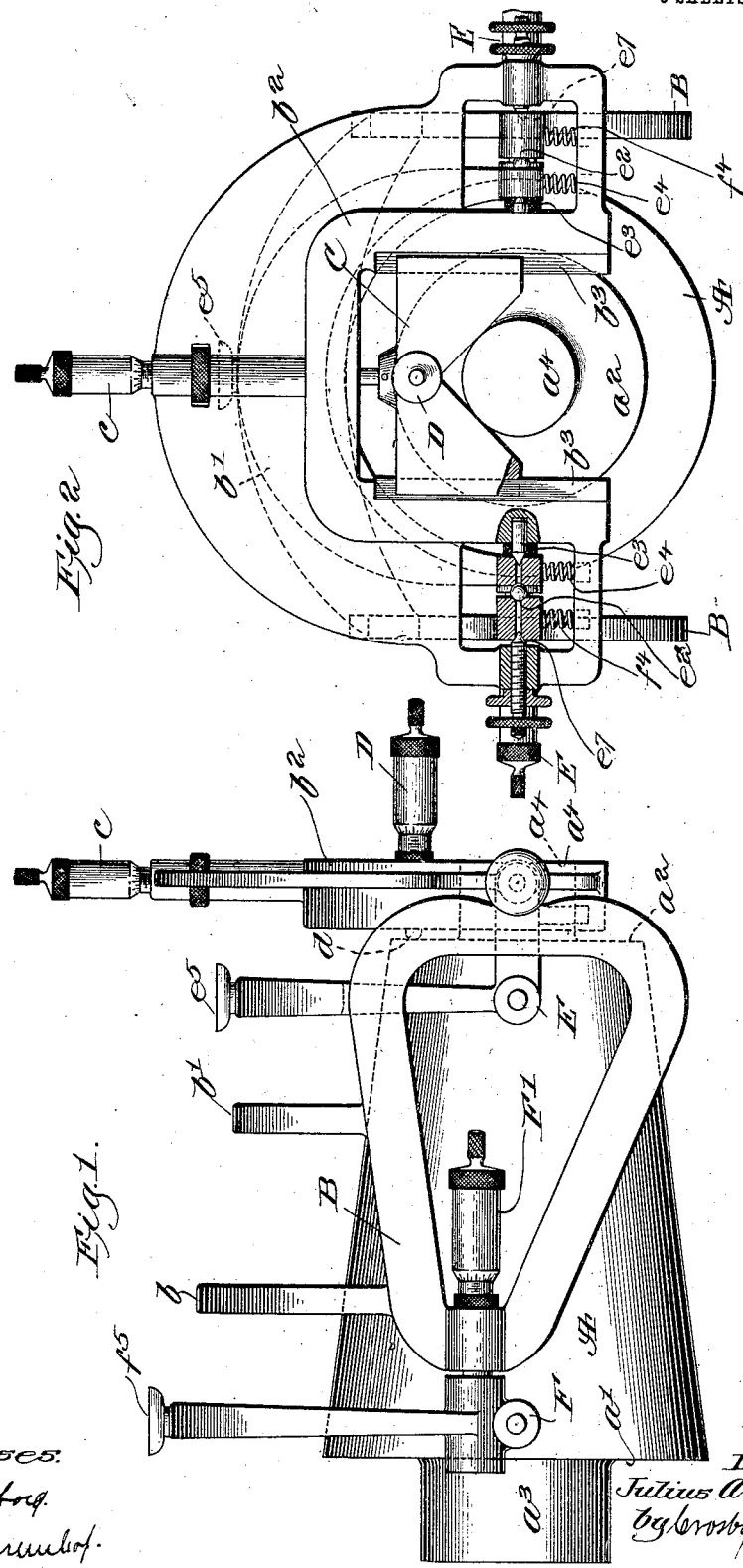
Witnesses:
W. C. Lunsford.
Fred S. Greenhof.
Inventor:
Julius A. Perkins
by Crosby & Gregory
Attys No. 764,203. PATENTED JULY 5, 1904.
J. A. PERKINS.
CONOMETER.
APPLICATION FILED AUG. 24, 1903.
NO MODEL. 6 SHEETS—SHEET 2.
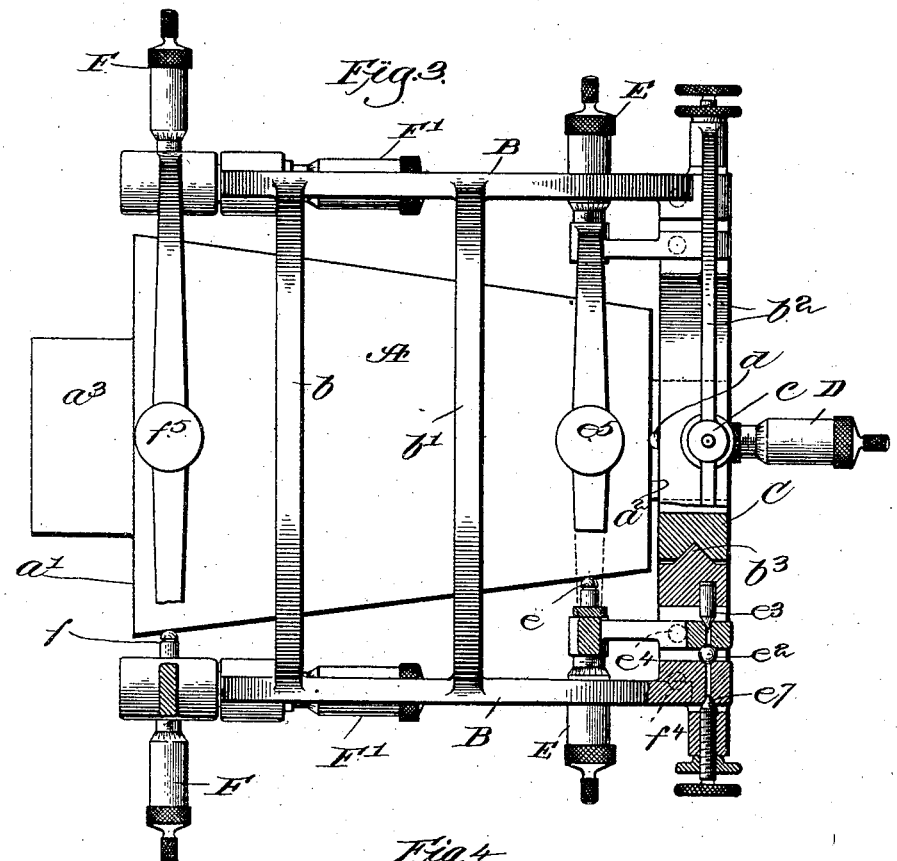
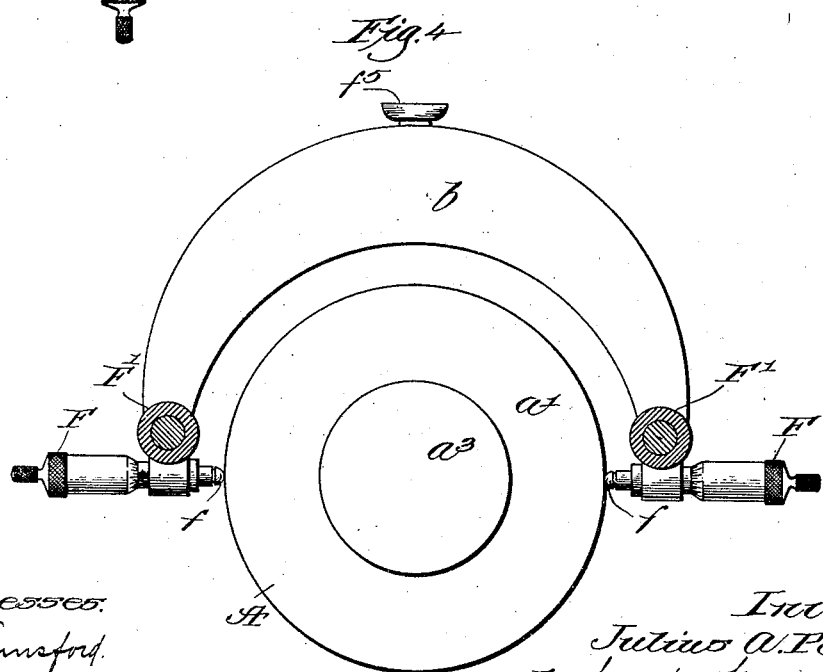
Witnesses:
Inventor
Julius A. Perkins
By Crosby & Gregory
Attys.

No. 764,203. PATENTED JULY 5, 1904.
J. A. PERKINS.
CONOMETER.
APPLICATION FILED AUG. 24, 1903.
NO MODEL. 6 SHEETS—SHEET 3.
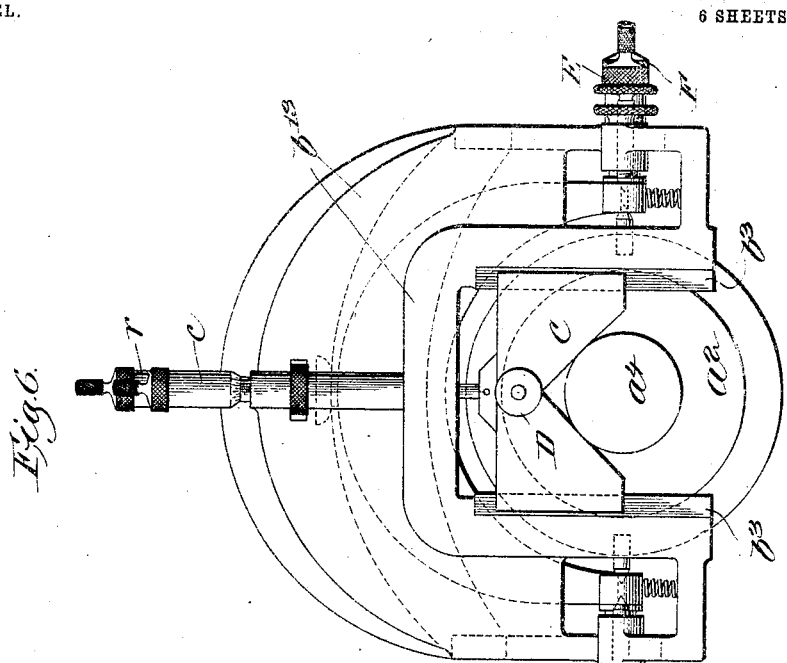
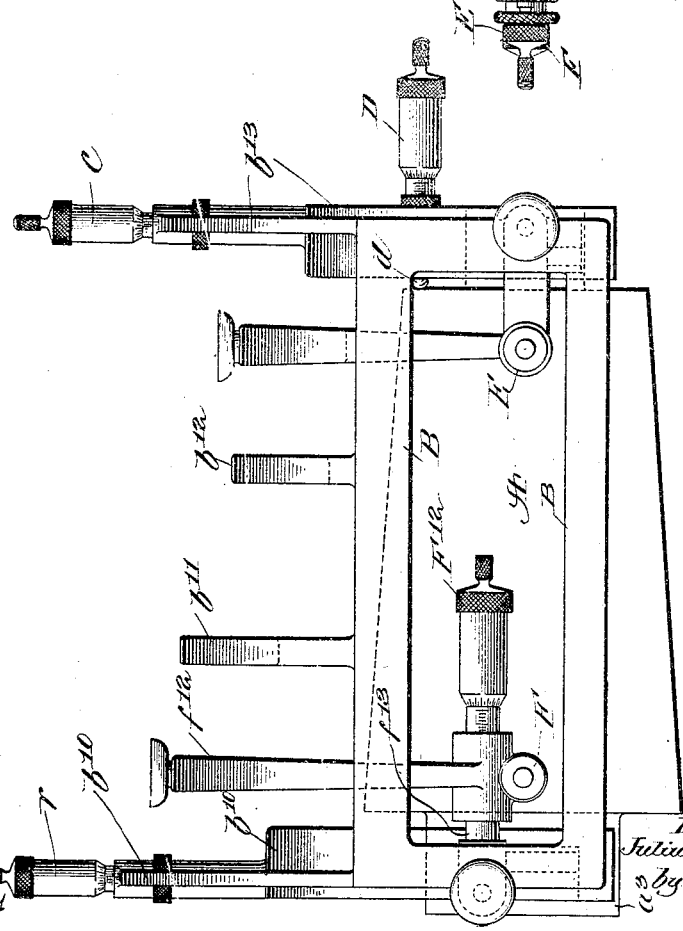

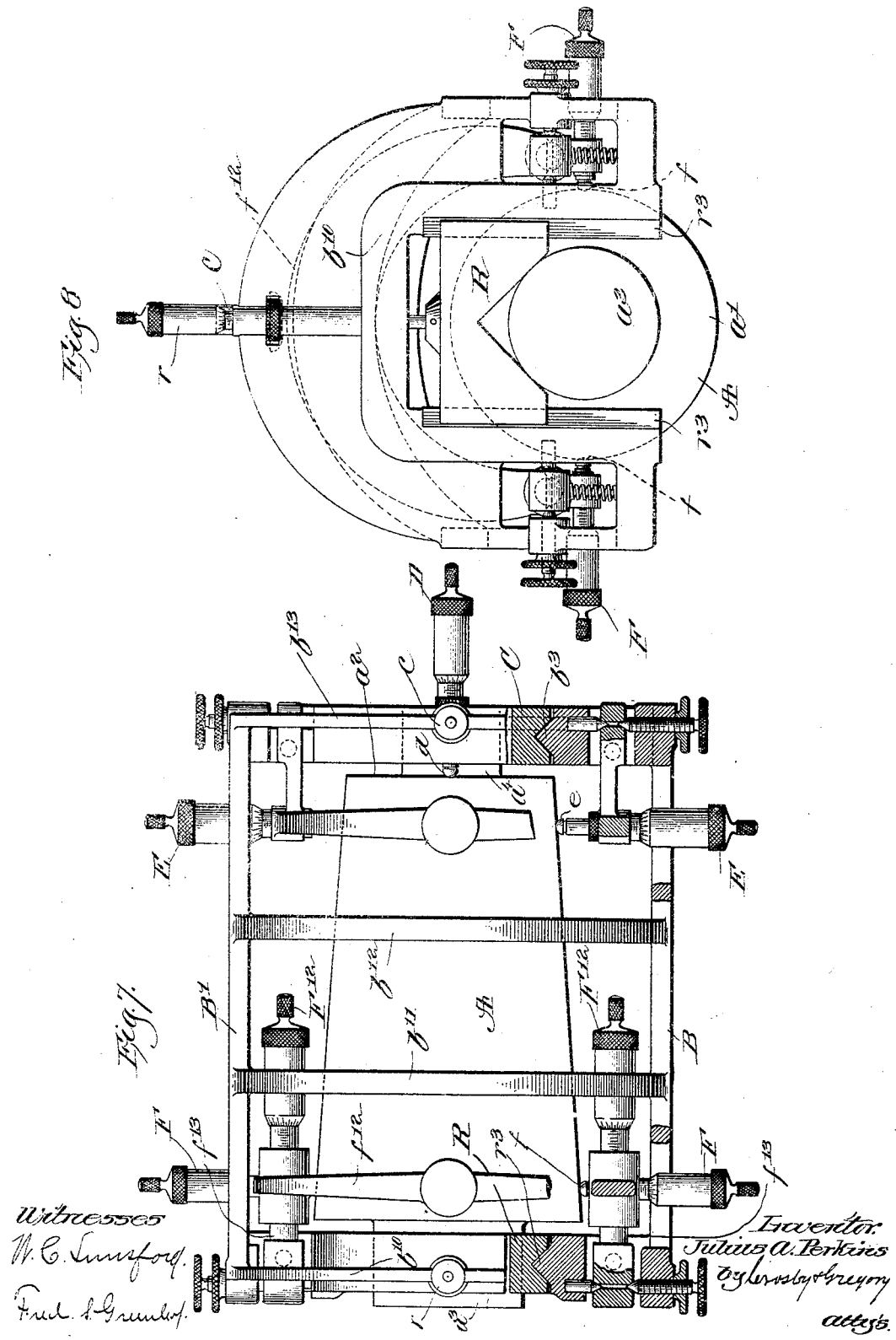

No. 764,203. PATENTED JULY 5, 1904.
J. A. PERKINS.
CONOMETER.
APPLICATION FILED AUG. 24, 1903.
NO MODEL. 6 SHEETS—SHEET 5.
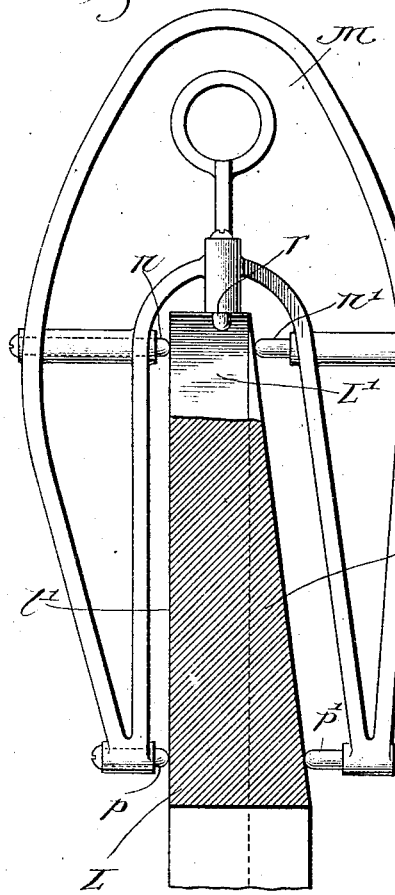
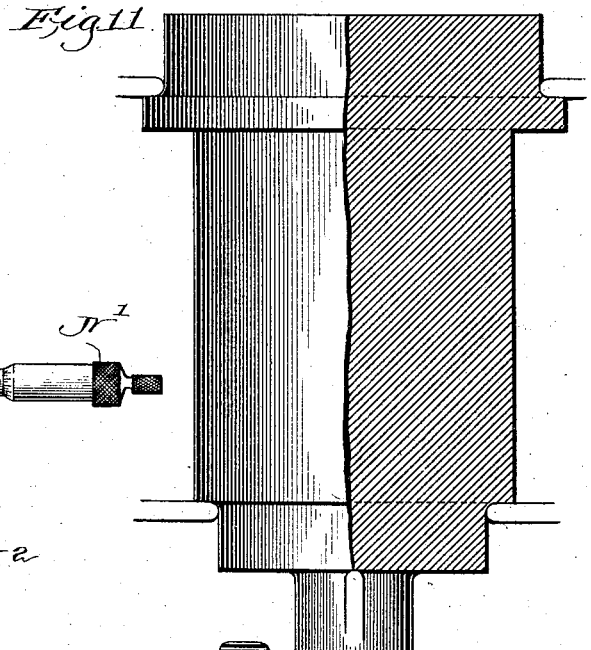
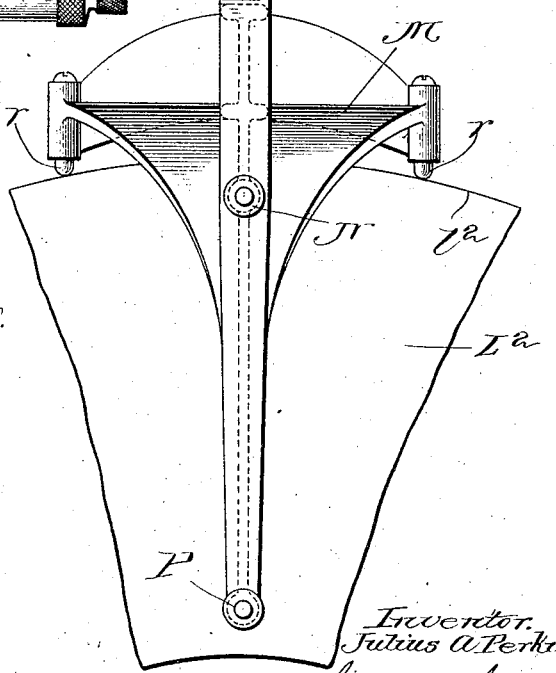
Witnesses.
W. C. Lunsford.
Fred S. Greenleaf.
Inventor.
Julius A. Perkins
by Crosby & Gregory
Attys.

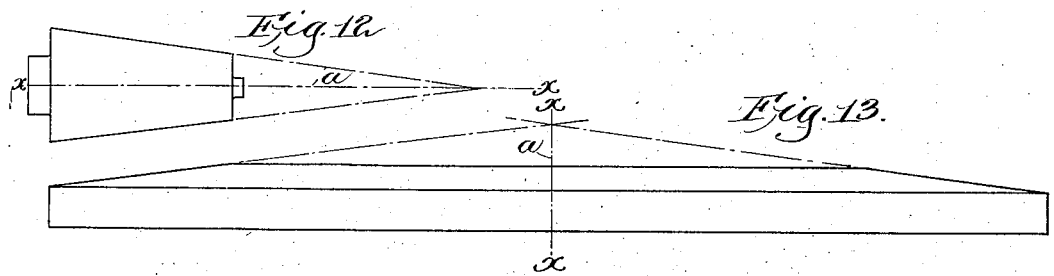
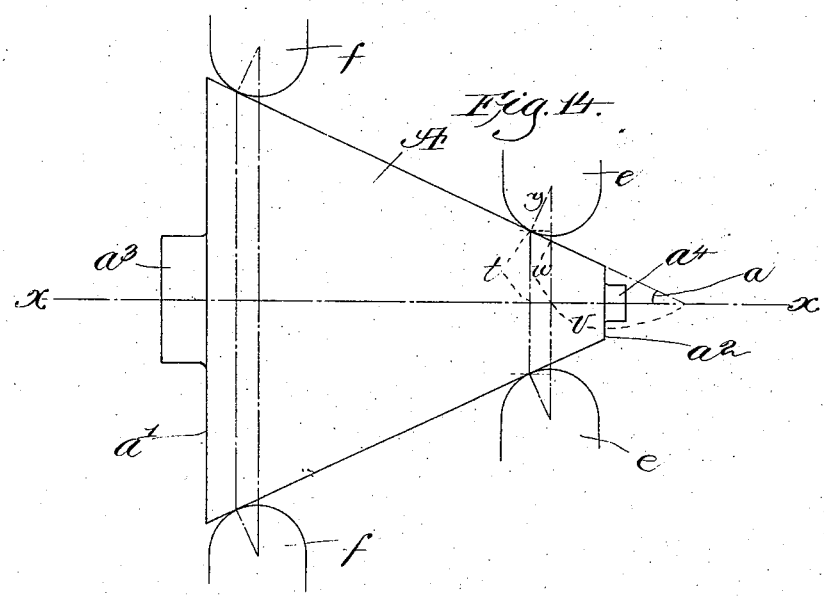
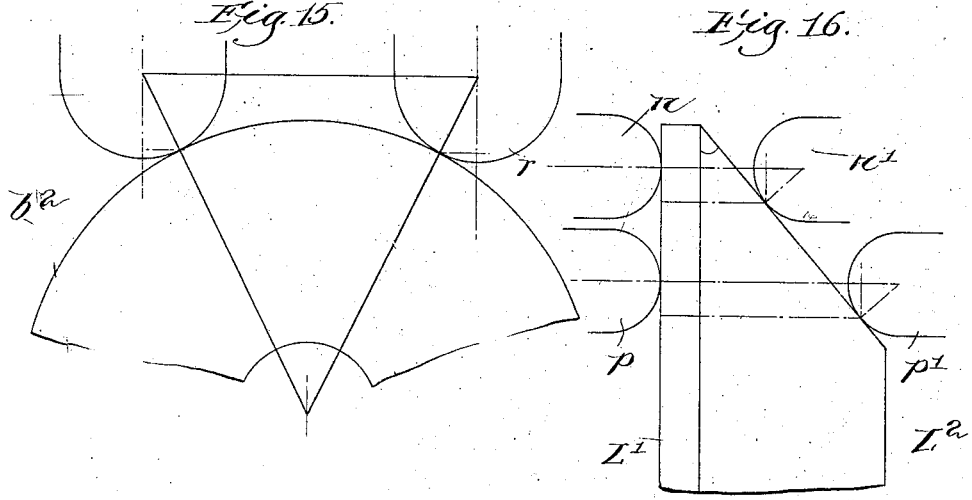

No. 764,203.                                                         Patented July 5, 1904.

UNITED STATES PATENT OFFICE.

JULIUS A. PERKINS, OF OMAHA, NEBRASKA.

CONOMETER.

SPECIFICATION forming part of Letters Patent No. 764,203, dated July 5, 1904.

Application filed August 24, 1903. Serial No. 170,508. (No model.)

*To all whom it may concern:*

Be it known that I, JULIUS A. PERKINS, a citizen of the United States, residing at Omaha, county of Douglas, State of Nebraska, have invented an Improvement in Conometers, of which the following description, in connection with the accompanying drawings, is a specification, like letters on the drawings representing like parts.
This invention relates to a device for measuring accurately bodies of a conical shape, and I have applied to it the name "conometer." While it is adapted to the measurement of various bodies used for various purposes, which have the shape of a cone, yet it is especially designed for use in roller-bearings in the measurement both of the tracks upon which the rollers run, the surface of which is conoidal, and also of the rollers themselves, which are frustums of cones. In the manufacture of such devices it is not only desirable but absolutely essential that the parts be constructed with absolute accuracy and of exact geometrical shape.
In the measurement of bodies having a cylindrical shape the present micrometer-gages are sufficient chiefly for the reason that it is not essential that the measurement should be taken every time in the same plane, since a cylindrical body has the same diameter throughout its length. In measuring bodies the surface of which is that of a cone peculiar conditions exist which render accurate measurement with known devices extremely difficult, if not impossible. In order that the desired conical form of the body being manufactured shall be secured, it is necessary that the angle of the cone or the angle between the axis and the elements of the cone shall be exactly determined and that this angle shall be constant throughout the length of the cone. In order to secure this result, it is necessary to take the measurement of the cone in a plurality of planes at given and constant distances from the apex of the cone or some other point having a fixed location with respect to the apex. For practical purposes I find that if the cone be measured in two of such planes located, respectively, near each end of the cone or frustum of a cone being formed it is sufficient.

In this application I have illustrated the device in several forms all embodying the same principle of operation and shown as adapted more particularly for the measurement in the one instance of conical rollers and in the other instance of conical tracks both for use in roller-bearings; but the device is adapted or with slight changes in construction may be adapted for the measurement of any other articles having surfaces of conical shape.

In the drawings, Figure 1 is a side elevation of a form of the conometer adapted for the measurement of a conical roller. Fig. 2 is an end elevation, partially in cross-section, of the device shown in Fig. 1. Fig. 3 is a top plan of the device shown in Figs. 1 and 2. Fig. 4 is an end elevation of the device shown in Fig. 1, but taken from the end opposite to that from which Fig. 2 is taken. Fig. 5 is a side elevation of another and in some respects a preferred form of a device similar to that shown in Figs. 1 to 4, inclusive, for measuring conical rollers. Fig. 6 is an end elevation of the device shown in Fig. 5. Fig. 7 is a top plan of the device shown in Fig. 5. Fig. 8 is an end elevation of the device shown in Fig. 5, but taken from the end opposite to that from which Fig. 6 is taken. Fig. 9 is a side elevation of a conometer in a form adapted for the measurement of the track of a roller-bearing where the conical surface approaches a plane surface. Fig. 10 is a top plan view of the device shown in Fig. 9. Fig. 11 is a plan view, partially in cross-section, of a test-piece of the conometer when the body to be measured is a conical roller. Fig. 12 is a plan view of a conical roller for a roller-bearing, showing its relation to the imaginary cone with which it forms a part. Fig. 13 is a plan view of the track of a roller-bearing, showing its relation to the imaginary cone of which it forms a part. Figs. 14, 15, and 16 are diagrammatic views illustrating the elements of the conical bodies to be measured in relation to the measuring-points of the conometer and the corrections which have to be made because of the size of the conometer-points, which are shown greatly exaggerated.

As already stated, in measuring conical bodies I find it necessary to measure the body diametrically in a plurality of planes—for example, two planes located, respectively, at known distances from the apex of the cone. When the angle of the cone marked $a$ in Figs. 12 and 13 or the angle between the cone element and its axis $x$ $x$ is forty-five degrees or less, the measurement of the cone can be taken with greater accuracy by fixing the measuring elements, which are usually micrometer-points, in a given position with respect to the apex of the cone and then obtaining the variable measurement of the diameter of the cone in such given position; but when this angle $a$ exceeds forty-five degrees and the surface of the cone approaches more or less a plane surface—as shown, for example, in Fig. 13—the measurement of the diameter of the cone in a plane at right angles to the axis becomes liable to practical error, because of the approach of the surface upon which the micrometer-points rest to parallelism with the plane of the points themselves. In this latter case, therefore, it is necessary to obtain the measurement of the cone by fixing the measuring elements of the conometer, which are usually micrometer-points, in a given position with respect to the axis of the cone and then obtaining the variable distance between the fixed plane or position of the points and the apex of the cone. It is of course evident in both cases that the distance from the apex to the plane of the diameter desired can be obtained by measuring the distance from that plane to any other point fixed with respect to the apex—as, for example, the base of the cone or a plane located at a given distance from the base of the cone—and it is also evident that the distance from the axis to the conical surface in a desired plane can be obtained by measuring the distance from a circle or cylindrical surface at a known distance from the axis—as, for example, the peripheral edge at the base of the cone or a continuation thereof when the same have been made accurately concentric with the axis. While, therefore, in each of the two cases above referred to the same two facts are ascertained—viz., first, the diameter of the cone in a given plane and, second, the distance of that plane from the apex of the cone—mechanical conditions caused by the variation in the angle of the cone referred to and illustrated in practice in the conical roller of a roller-bearing and the track therefor (shown in Figs. 12 and 13) require two different types of my conometer, which, while embodying the same principle, obtain the result in a slightly-different manner. The devices illustrated in the first eight figures of the drawings are for measuring that form of cone where the variable measurement may more accurately be taken directly in the plane of the diameter to be measured, while the device illustrated in Figs. 9 and 10 of the drawings is for the measurement of a cone where the variable measurement cannot as well be taken in the plane of the diameter, but can be practically taken parallel to the axis.

While it is not essential, simplicity of construction and ease of calculation demands that when there are two or more measuring elements, such as micrometer-points, between which desired measurements are taken, they shall all lie in the same plane. For example, the micrometer-points for measuring a diameter shall all lie in the plane of that diameter, and the micrometer-points for measuring the distance from the apex to the diameter shall all lie in a plane parallel to and intersecting the axis of the cone. If they are otherwise located, while they may be fixed in position, considerable calculation would be required, the construction would be more involved, and the degree of accuracy would be lessened. In the devices shown in the first eight figures of the drawings the diametrical measurements are taken in two planes at given distances from the end of the conical roller, and in the device shown in Figs. 9 and 10, where the angle of the cone is much more than forty-five degrees, the measurements are taken at given distances from the outer periphery of the roller track-piece.

In conical bodies, such as conical rollers and roller-tracks having a conical surface, it is impossible to base the measurements from the apex of the cone; but in the case of the rollers it is absolutely essential that the journals for the rollers shall be true cylinders and concentric with the axis of the roller, and also that the ends of the rollers themselves shall be plane surfaces at right angles to the axis. Hence these may serve as bases for the desired measurements. In the case of tracks for the rollers, such as herein shown, it is essential that either the interior or exterior peripheral surface shall also be cylindrical and concentric with the axis of the cone, and it is desirable, if not essential, that the bottom of the track shall be a plane surface at right angles to the axis of the cone. Hence these surfaces also serve as bases for the desired measurement. If, however, surfaces as last referred to are not necessary in the construction of the device to be measured, it is comparatively easy to produce either cylindrical or plane surfaces with absolute accuracy upon the parts which may serve as bases for the desired measurements.

In Figs. 1, 2, 3, and 4 I have shown a form of conometer embodying my invention designed for the measurement of a cone for a roller-bearing having a small angle. The frusto-conical roller A is shown with plane ends $a'$ $a^2$ and cylindrical concentric bearings $a^3$ $a^4$. The frame of the conometer is shown with two side pieces B, united by arched connections $b\,b'\,b^2$, the latter of which is provided with ribs $b^3$, upon which slides a cross-bar C, a micrometer-screw $c$ being connected with the cross-bar C, so that it may be accurately adjusted with respect to the frame. The cross-bar C has a V-shaped notch formed therein, whereby it is adapted to rest upon one of the bearings of the roller, as $a^4$, and support the conometer symmetrically with respect to the axis of the roller. In conical bodies where the length of the cone is considerable and the angle small one such support, as the cross-bar C, may be found sufficient and will serve to hold the conometer in line with the axis of the cone without appreciable variation in accuracy of measurement; but except in such cases it is preferable that the frame of the conometer be similarly supported at both ends, and the conometer illustrated in Figs. 5, 6, 7, and 8 shows such support, whereby absolute accuracy in the positioning of the conometer parallel to the axis of the cone is secured. In each case a micrometer-point $d$ is provided in one of the cross-bars, as C, and a micrometer-screw D is connected therewith, whereby the micrometer-point may be adjusted parallel to the axis of the cone and brought into contact with one or the other plane surfaces forming the ends of the roller. In Figs. 1, 2, 3, and 4 there are two pair of micrometer-points for obtaining diametrical measurements in two planes. One pair, $e\,e$, Fig. 3, is attached by micrometer-screws E E to an arched pivot at $e^2\,e^3$, Figs. 2 and 3, to the frame, and springs $e^4$ serve to maintain this arch normally in elevated position, so that upon depression of the arch by gently pressing upon the thumb-piece $e^5$ the diameter may be determined in the usual manner. In a similar manner measurement is determined by the other pair of micrometer-points $f\,f$, which are likewise provided with micrometer-screws F F. This pair of points are attached to the frame B B, which is likewise pivoted at the points $e^2\,e^7$, Figs. 2 and 3, and normally held in elevated position by the springs $f^4\,f^4$ until gently depressed by the thumb-piece $f^5$. The end of the frame B B is connected with an arch-piece carrying the thumb-piece $f^5$ and is adjustable on the frame B B by means of the micrometer-screws F'. By means of the micrometer-screw $c$, which serves to adjust the cross-bar C, the lines of the pivots $e^2\,e^3\,e^7$ are brought into line with the axis of the conical body to be measured. This may be done in various ways, depending upon the character of the article being measured. The device shown in the drawings, as has already been explained, is adapted for use in connection with a conical roller-bearing having journals which are true cylinders concentric with the axis of the roller and which serve as bases for the measurement. The zero-point for the micrometer-screw $c$ may designate the position of the device when the apex of the V-shaped notch in the cross-bar C is in line with the pivots $e^2\,e^3\,e^7$. The distance from the apex of this V-shaped notch to the axis of the cone, which is coincident with the journal $a^4$, will vary, of course, with the radius of the journal, which radius is known or ascertainable by a micrometer-caliper, and it will be seen that this distance is equal to the radius of the journal multiplied by the tangent of half the angle formed by the V-shaped notch; but, as shown, it is convenient to make this angle of the V-shaped notch ninety degrees, so that half the angle is forty-five degrees, and the tangent of the angle of forty-five degrees equals one divided by the square root of two. Hence to bring the line of the pivots $e^2\,e^3\,e^7$ into line with the axis of the conical body the micrometer-screw $c$ is set so that its reading will be the result of multiplying the radius by the square root of two, which is 1.414214. For example, if the radius of the journal $a^4$ is one-half inch the micrometer-screw $c$ should be set to read .707107 inches above the zero-point.

The form of conometer shown in Figs. 5, 6, 7, and 8 is similar to that just described; but in this case the arch-piece carrying the second pair of micrometer-points is separately pivoted from the arch-piece carrying the first pair to the main frame. The frame after being adjusted into position with respect to the axis of the cone remains fixed, and the pairs of micrometer-points are separately moved to take the desired measurement. It will not be necessary to describe the device of Figs. 5, 6, 7, and 8 in detail, as it will be seen to be very similar in construction save for the one feature mentioned to that already described. The frame is composed of two side pieces B', B', united by arch-pieces $b^{10}$, $b^{11}$, $b^{12}$, and $b^{13}$. The micrometer-screw $c$, the cross-bar C, and the ribs $b^3$ are all as in the device just described, and a similar construction is provided at the opposite end, consisting of the micrometer-screw $r$, cross-bar R, and ribs $r^3$, whereby the other end of the frame is positioned and supported accurately upon the journal $a^3$. The micrometer-point $d$, with the adjusting-screw D, is shown in the cross-bar C, whereby the position of the conometer with respect to the apex of the cone is determined by positioning it with respect to the plane surface $a^2$ of the smaller end of the roller; but it is obvious that this device could, if desired, be transferred to the cross-bar R. The pair of micrometer-points $f\,f$, carried by the micrometer-screws F in this latter device, are carried by an arch $f^{12}$ and are mounted to be adjustable therewith and with respect to the other pair $e\,e$ by means of the micrometer-screws $F^{12}$. The arch $f^{12}$ is pivoted to the frame B B by being mounted upon bars $f^{13}$, pivoted at the rear of the frame in a similar manner as the corresponding arch carrying the micrometer-points $e\,e$ is pivoted at the other end of the frame. It will thus be seen that the micrometer-screws D F' provide for accurate determination of the distance of the respective pairs of micrometer-points $e\,e$, $f\,f$ from the plane end of the conical body or roller and that the pairs of micrometer-points themselves provide for the accurate determination of the diameter of the roller or conical body in given planes.

In the form of the device illustrated in Figs. 9 and 10 L represents a portion of a track for a roller-bearing consisting of a cylindrical base L' and a conical portion $L^2$. In this case the angle of the cone is such that the conical surface approaches the plane surface. In this form of conical-shaped body it is assumed that the surface $l'$ is a plane surface at right angles to the axis of the cone and the surface $l^2$ is a true cylindrical surface concentric to the axis of the cone. The form of the device herein illustrated for measuring this type of body consists of a frame M, in which are mounted two pairs of conometer-points $n\,n'$, $p\,p'$, one of said pairs being shown as fixed and the other adjustable by micrometer-screws N P, respectively. These pairs of conometer-points are shown at fixed distances apart; but, as in the case of the device already described, means may be employed for adjusting the distance between the pairs. Another pair of conometer-points $r\,r$ are mounted in the frame M in a plane transverse to that of the other conometer-points and serve to engage the peripheral cylindrical surface $l^2$. The pairs of conometer-points $n\,n'$ and $p\,p'$ are arranged at right angles to the pair $r\,r$ and are intermediate thereof.

While I have thus shown several embodiments of my invention, it is obvious from what has already been stated that the invention may be embodied in various forms, according to the particular conditions of the conical body to be measured, without altering in any way the principles of the invention.

In measuring any of the conical bodies referred to successive measurements are taken on different radial lines, and all the devices are adapted to be shifted for this purpose either by the movement of the conometer itself or by the movement of the body being measured, the surfaces serving as the bases for the measurements being in each instance adapted to such shifting.

In what has been said heretofore it has been assumed that the conometer-points are true mathematical points; but it is obvious that such a point or even an approach to such a point is impossible not only for constructive reasons, but because of the inaccuracy which would be caused by the wear of a small point. It is necessary, therefore, to make the conometer-points in each instance of sufficient size so that the accuracy of the measurement may not be lessened by the wearing away of the points. I therefore make the conometer-points of considerable size and absolutely spherical on the end. This renders necessary corrections in the measurements, which are explained by reference to Figs. 14, 15, and 16, in which the conometer-points are shown greatly exaggerated. Fig. 14 shows the conometer-points arranged as in the device illustrated in the first eight figures of the drawings, and Figs. 15 and 16 show the conometer-points arranged as in the device illustrated in Figs. 9 and 10 of the drawings. In these three views, Figs. 14, 15, and 16, the conical bodies illustrated in connection with the devices of Figs. 1 to 10 of the drawings are shown exaggerated in portions, but with the same letters of reference to indicate their parts. An explanation of the correction in connection with the conometer-points as shown in Fig. 14 will suffice for both forms. In Fig. 14, $x\,x$ represent the axis of the cone, and $a$ the angle of the cone. The point of the conometer is shown as spherical at its end, having a radius $y$. $v$ represents, therefore, the distance from the apex of the cone to the axis of the conometer-points or the distance between the apex of the cone and the plane in which the diametrical measurement is to be taken, and this diametrical measurement desired is represented by $w$; but it will be seen that from the size of the conometer-points the measurement actually taken is represented by $t$. The radius of the conometer-point $y$ is a known quantity. The angle of the cone $a$ is known, and the measurement $w$ is known. It will be seen, therefore, from a simple trigonometrical calculation that $$t = \frac{w\,y\,\sin.\,a}{v} + w.$$

A suitable modification of course must be made if the distance $v$ is not measured from the apex of the cone, but from a plane, such as the end of a roller in a roller-bearing, and either the distance $t$ or the distance $w$ may be regarded as a known quantity, the other being ascertained from the formula. When the measurements are taken in, the other type of a cone having an angle of more than forty-five degrees, as illustrated in Figs. 15 and 16, the angle $a\,x$ will of course be the complement of the cone-angle $a$; but upon the same principles above set forth the exact distances desired may be obtained.

When a number of conical bodies—such, for example, as the rollers for roller-bearings—are to be made, it is desirable to set the conometer to the desired measurement in the first place and test the roller as it is being ground or otherwise formed. For this purpose a test-piece, such as shown in Fig. 11, may be made, which will reduce the labor of measurement and insure similarity, as well as accuracy, of the various rollers. This test-piece is formed with a series of shoulders properly located with respect to the apex and a series properly located with respect to the axis of the cone, these shoulders being arranged to allow for the size of the micrometer-points on principles already explained. By setting the micrometer-points so that they will butt against both series of shoulders they will be in position to gage the roller or other conical body being formed.

In the following claims the distance from the apex refers either to the actual apex, real or imaginary, of the conical body or to a plane, real or imaginary, at a known distance from the apex and perpendicular to the axis, because either the distance from the apex or from such a plane may be converted into the other by simple addition or subtraction, and the term "diameter" refers either to the actual diameter or radius or some fraction of the diameter for the same reason.

Having described my invention, what I claim as new, and desire to secure by Letters Patent, is—

1. A conometer comprising a plurality of means for determining accurately a respective plurality of diameters of a conical body in a respective plurality of planes perpendicular to the axis of the conical body, and means for determining accurately the distance of each of said planes from the apex of the cone.

2. A conometer comprising two means for determining accurately the diameters of a conical body in two different planes perpendicular to the axis of the conical body, and means for determining accurately the distance of each of said planes from the apex of the cone.

3. A conometer comprising means for determining accurately the diameters of the conical body in a plurality of planes, means non-dependent upon the conical surface for locating said planes perpendicular to the axis of the cone, and means for determining accurately the distance of each of said planes from the apex of the cone.

4. A conometer comprising means for determining accurately the diameters of the conical body in two planes, means non-dependent upon the conical surface to locate said planes perpendicular to the axis of the cone, and means for determining accurately the distance of each of said planes from the apex of the cone.

5. A conometer comprising a frame, means for maintaining the frame in a fixed position with respect to the apex and the axis of the conical body, means mounted on said frame for determining accurately the diameters of the conical body in a plurality of planes perpendicular to the axis of the cone, and means for determining accurately the distance of said planes from the apex of the cone.

6. A conometer comprising a frame, means for maintaining the frame in a fixed position with respect to the apex and the axis of the conical body, means mounted on said frame for determining accurately the diameters of the conical body in two planes perpendicular to the axis of the cone, and means for determining accurately the distance of said planes from the apex of the cone.

7. A conometer comprising a frame, means for maintaining the frame in and accurately adjusting it into a fixed position with respect to the apex and the axis of the conical body, means mounted on said frame for determining accurately the diameters of the conical body in a plurality of planes perpendicular to the axis of the cone, and means for determining accurately the distance of said planes from the apex of the cone.

8. A conometer comprising a frame, means for maintaining the frame in and accurately adjusting it into a position parallel to the axis and fixed with respect to the apex of the conical body, means mounted on said frame for determining accurately the diameters of the conical body in a plurality of planes perpendicular to the axis of the cone, and means for determining accurately the distance of said planes from the apex of the cone.

9. A conometer comprising a frame adapted to rest on axial projections of the conical body, means for accurately adjusting the frame into a position parallel to the axis and fixed with respect to the apex of the conical body, means mounted on said frame for determining accurately the diameters of the conical body in a plurality of planes perpendicular to the axis of the cone, and means for determining accurately the distance of said planes from the apex of the cone.

10. A conometer comprising a frame, means for maintaining the frame in a fixed position with respect to the apex and the axis of the conical body, means including pairs of micrometer-points mounted on said frame for determining accurately the diameters of the conical body in a plurality of planes perpendicular to the axis of the cone, and means for determining accurately the distance of said planes from the apex of the cone.

11. A conometer comprising a frame, means for maintaining the frame in and accurately adjusting it into a fixed position with respect to the apex and the axis of the conical body, means including pairs of micrometer-points mounted on said frame for determining accurately the diameters of the conical body in a plurality of planes perpendicular to the axis of the cone, and means for determining accurately the distance of said planes from the apex of the cone.

12. A conometer comprising a frame, means for maintaining the frame in and accurately adjusting it into a position parallel to the axis and fixed with respect to the apex of the conical body, means including pairs of micrometer-points mounted on said frame for determining accurately the diameters of the conical body in a plurality of planes perpendicular to the axis of the cone, and means for determining accurately the distance of said planes from the apex of the cone.

13. A conometer comprising a frame adapted to rest on axial projections of the conical body, means for accurately adjusting the frame into a position parallel to the axis and fixed with respect to the apex of the conical body, means including pairs of micrometer-points mounted on said frame for determining accurately the diameters of the conical body in a plurality of planes perpendicular to the axis of the cone, and means for determining accurately the distance of said planes from the apex of the cone.

14. A conometer comprising a frame, means for maintaining the frame in a fixed position with respect to the apex and the axis of the conical body, two pairs of micrometer-points mounted on said frame for determining accurately the diameters of the conical body in two planes perpendicular to the axis of the cone, means for accurately adjusting one of said pairs of micrometer-points with respect to the other, and means for determining accurately the distance of the plane of one of said pairs of micrometer-points from the apex of the cone.

15. A conometer comprising a frame, means for maintaining the frame in and accurately adjusting it into a fixed position with respect to the apex and the axis of the conical body, two pairs of micrometer-points mounted on said frame for determining accurately the diameters of the conical body in two planes perpendicular to the axis of the cone, means for accurately adjusting one of said pairs of micrometer-points with respect to the other, and means for determining accurately the distance of the plane of one of said pairs of micrometer-points from the apex of the cone.

16. A conometer comprising a frame, means for maintaining the frame in and accurately adjusting it into a position parallel to the axis and fixed with respect to the apex of the conical body, two pairs of micrometer-points mounted on said frame for determining accurately the diameters of the conical body in two planes perpendicular to the axis of the cone, means for accurately adjusting one of said pairs of micrometer-points with respect to the other, and means for determining accurately the distance of the plane of one of said pairs of micrometer-points from the apex of the cone.

17. A conometer comprising a frame adapted to rest on axial projections of the conical body, means for accurately adjusting the frame into a position parallel to the axis and fixed with respect to the apex of the conical body, two pairs of micrometer-points mounted on said frame for determining accurately the diameters of the conical body in two planes perpendicular to the axis of the cone, means for accurately adjusting one of said pairs of micrometer-points with respect to the other, and means for determining accurately the distance of the plane of one of said pairs of micrometer-points from the apex of the cone.

18. A conometer comprising a frame, means for maintaining the frame in a fixed position with respect to the apex and the axis of a conical body, a plurality of arches each carrying a pair of micrometer-points and each movable on said frame transversely of the axis of the cone whereby the diameters of the conical body may be accurately determined in a plurality of planes perpendicular to the axis of the cone, and means for determining accurately the distance of said planes from the apex of the cone.

19. A conometer comprising a frame, means for maintaining the frame in a fixed position with respect to the apex and the axis of a conical body, two arches each carrying a pair of micrometer-points, and each movable on said frame transversely of the axis of the cone and normally held by springs away from the axis, whereby upon movement of the arches to bring the micrometer-points into line with the axis the diameters of the conical body may be accurately determined in two planes perpendicular to the axis of the cone, and means for determining accurately the distance of said planes from the apex of the cone.

20. A conometer comprising a frame, means for maintaining the frame in a fixed position with respect to the apex and the axis of the conical body, two arches each carrying a pair of micrometer-points and each movable on said frame transversely of the axis of the cone, whereby the diameters of the conical body may be accurately determined in two planes perpendicular to the axis of the cone, means for accurately adjusting one of said arches with respect to the other, and means for accurately determining the distance of the plane of one of said arches from the apex of the cone.

21. A conometer comprising a frame, means for maintaining the frame in a fixed position with respect to the apex and the axis of the conical body, two arches each carrying a pair of micrometer-points and each movable on said frame transversely of the axis of the cone and normally held by springs away from the axis of the cone, whereby upon movement of the arches to bring the micrometer-points into line with the axis the diameters of the conical body may be accurately determined in two planes perpendicular to the axis of the cone, means for accurately adjusting one of said arches with respect to the other, and means for accurately determining the distance of the plane of one of said arches from the apex of the cone.

22. A conometer comprising a frame, means for maintaining and accurately adjusting the frame into a position parallel to the axis and fixed with respect to the apex of the conical body, two arches each carrying a pair of micrometer-points, and each movable on said frame transversely of the axis of the cone and normally held by springs away from the axis, whereby upon movement of the arches to bring the micrometer-points into line with the axis the diameters of the conical body may be accurately determined in two planes perpendicular to the axis of the cone, and means for determining accurately the distance of said planes from the apex of the cone.

23. A conometer comprising a frame, means for maintaining and accurately adjusting the frame into a position parallel to the axis and fixed with respect to the apex of the conical body, two arches each carrying a pair of micrometer-points and each movable on said frame transversely of the axis of the cone, whereby the diameters of the conical body may be accurately determined in two planes perpendicular to the axis of the cone, means for accurately adjusting one of said arches with respect to the other, and means for accurately determining the distance of the plane of one of said arches from the apex of the cone.

24. A conometer comprising a frame, means for maintaining and accurately adjusting the frame into a position parallel to the axis and fixed with respect to the apex of the conical body, two arches each carrying a pair of micrometer-points and each movable on said frame transversely of the axis of the cone and normally held by springs away from the axis of the cone, whereby upon movement of the arches to bring the micrometer-points into line with the axis the diameters of the conical body may be accurately determined in two planes perpendicular to the axis of the cone, means for accurately adjusting one of said arches with respect to the other, and means for accurately determining the distance of the plane of one of said arches from the apex of the cone.

25. A conometer comprising a frame, means for maintaining the frame in a fixed position with respect to the apex and the axis of a conical body, a plurality of arches each carrying a pair of micrometer-points and each pivotally movable on said frame transversely of the axis of the cone whereby the diameters of the conical body may be accurately determined in a plurality of planes perpendicular to the axis of the cone, and means for determining accurately the distance of said planes from the apex of the cone.

26. A conometer comprising a frame, means for maintaining the frame in a fixed position with respect to the apex and the axis of a conical body, two arches each carrying a pair of micrometer-points, and each pivotally movable on said frame transversely of the axis of the cone and normally held by springs away from the axis, whereby upon movement of the arches to bring the micrometer-points into line with the axis the diameters of the conical body may be accurately determined in two planes perpendicular to the axis of the cone, and means for determining accurately the distance of said plane from the apex of the cone.

27. A conometer comprising a frame, means for maintaining the frame in a fixed position with respect to the apex and the axis of the conical body, two arches each carrying a pair of micrometer-points and each pivotally movable on said frame transversely of the axis of the cone, whereby the diameters of the conical body may be accurately determined in two planes perpendicular to the axis of the cone, means for accurately adjusting one of said arches with respect to the other, and means for accurately determining the distance of the plane of one of said arches from the apex of the cone.

28. A conometer comprising a frame, means for maintaining the frame in a fixed position with respect to the apex and the axis of the conical body, two arches each carrying a pair of micrometer-points and each pivotally movable on said frame transversely of the axis of the cone and normally held by springs away from the axis of the cone, whereby upon movement of the arches to bring the micrometer-points into line with the axis the diameters of the conical body may be accurately determined in two planes perpendicular to the axis of the cone, means for accurately adjusting one of said arches with respect to the other, and means for accurately determining the distance of the plane of one of said arches from the apex of the cone.

29. A conometer comprising a frame, means for maintaining and accurately adjusting the frame into a position parallel to the axis and fixed with respect to the apex of the conical body, two arches each carrying a pair of micrometer-points, and each pivotally movable on said frame transversely of the axis of the cone and normally held by springs away from the axis, whereby upon movement of the arches to bring the micrometer-points into line with the axis the diameters of the conical body may be accurately determined in two planes perpendicular to the axis of the cone, and means for determining accurately the distance of said plane from the apex of the cone.

30. A conometer comprising a frame, means for maintaining and accurately adjusting the frame into a position parallel to the axis and fixed with respect to the apex of the conical body, two arches each carrying a pair of micrometer-points and each pivotally movable on said frame transversely of the axis of the cone, whereby the diameters of the conical body may be accurately determined in two planes perpendicular to the axis of the cone, means for accurately adjusting one of said arches with respect to the other, and means for accurately determining the distance of the plane of one of said arches from the apex of the cone.

31. A conometer comprising a frame, means for maintaining and accurately adjusting the frame into a position parallel to the axis and fixed with respect to the apex of the conical body, two arches each carrying a pair of micrometer-points and each pivotally movable on said frame transversely of the axis of the cone and normally held by springs away from the axis of the cone, whereby upon movement of the arches to bring the micrometer-points into line with the axis the diameters of the conical body may be accurately determined in two planes perpendicular to the axis of the cone, means for accurately adjusting one of said arches with respect to the other, and means for accurately determining the distance of the plane of one of said arches from the apex of the cone.

In testimony whereof I have signed my name to this specification in the presence of two subscribing witnesses.

JULIUS A. PERKINS.

Witnesses:
    EDWARD E. BRUCE,
    PAUL GOEPEL.